(12) United States Patent
Edel et al.

(10) Patent No.: US 9,944,874 B2
(45) Date of Patent: Apr. 17, 2018

(54) LIGNITE DRYING WITH A HEAT RECOVERY CIRCUIT

(71) Applicant: ALSTOM Technology Ltd, Baden (CH)

(72) Inventors: Thomas Edel, Colmar (FR); Frederic Geiger, Giromagny (FR); Thierry Pourchot, Naves Parmclan (FR); Didier Wantz, Bavilliers (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 140 days.

(21) Appl. No.: 15/162,987

(22) Filed: May 24, 2016

(65) Prior Publication Data

US 2016/0348019 A1 Dec. 1, 2016

(30) Foreign Application Priority Data

May 26, 2015 (EP) .................................... 15290139

(51) Int. Cl.
*C10L 5/04* (2006.01)
*F01K 7/16* (2006.01)
(Continued)

(52) U.S. Cl.
CPC .................. *C10L 5/04* (2013.01); *F01K 5/00* (2013.01); *F01K 7/16* (2013.01); *F01K 11/02* (2013.01); *F26B 23/001* (2013.01); *F26B 23/002* (2013.01); *F26B 23/10* (2013.01); *C10L 2270/04* (2013.01); *C10L 2290/08* (2013.01); *F23K 2201/20* (2013.01); *Y02P 70/40* (2015.11); *Y02P 70/405* (2015.11)

(58) Field of Classification Search
CPC .... C10L 5/04; C10L 2290/08; C10L 2270/04; F01K 5/00; F01K 7/16; F01K 11/02; F26B 23/001; F26B 23/10; F26B 23/002; Y02P 70/405; Y02P 70/40; F23K 2201/20
USPC ................................. 60/653, 654, 677–680
See application file for complete search history.

(56) References Cited

U.S. PATENT DOCUMENTS

| 4,291,539 A | 9/1981 | Potter |
| 4,601,113 A | 7/1986 | Draper et al. |

(Continued)

FOREIGN PATENT DOCUMENTS

| AU | 1404783 A | 8/1983 |
| CN | 101881191 A | 11/2010 |

(Continued)

OTHER PUBLICATIONS

Rupprecht, T., and Fielenbach, C., "Efficiency and Flexibility-Techno-Economical Challenges for Pre-Dried Lignite Fired Power Plants," POWER-GEN Europe, Milan, Italy, pp. 1-19 (Jun. 7-9, 2011).

(Continued)

*Primary Examiner* — Hoang Nguyen

(57) ABSTRACT

The invention relates to a lignite fired steam power plant comprising a water/steam power cycle, a dryer system for drying lignite coal and a heat recovery system for recovering thermal energy from the dryer system. The heat recovery system vaporises condensate against a vapour line of the dryer steam and then compresses the vaporised condensate for use to preheat either or both combustion air or condensate of the water/steam power cycle.

10 Claims, 3 Drawing Sheets

(51) Int. Cl.
*F26B 23/00* (2006.01)
*F26B 23/10* (2006.01)
*F01K 11/02* (2006.01)
*F01K 5/00* (2006.01)

(56) References Cited

U.S. PATENT DOCUMENTS

| | | | |
|---|---|---|---|
| 4,601,115 | A | 7/1986 | Draper et al. |
| 5,353,517 | A | 10/1994 | Weiss |
| 6,148,599 | A | 11/2000 | McIntosh et al. |
| 6,497,102 | B2 * | 12/2002 | Liebig .................. F01K 23/106 60/39.182 |
| 8,661,821 | B2 | 3/2014 | Zhao et al. |
| 2008/0201980 | A1 * | 8/2008 | Bullinger .................. B03B 4/06 34/493 |
| 2010/0212320 | A1 | 8/2010 | Block et al. |
| 2010/0313442 | A1 * | 12/2010 | Russell .................... F23K 1/04 34/468 |
| 2011/0162277 | A1 * | 7/2011 | Russell .................... C10J 3/72 48/77 |
| 2011/0179799 | A1 * | 7/2011 | Allam ...................... F23M 5/00 60/772 |
| 2011/0214427 | A1 | 9/2011 | Zhao et al. |
| 2012/0055158 | A1 | 3/2012 | Berger et al. |
| 2013/0047509 | A1 * | 2/2013 | Ariyapadi ................. C10J 3/00 48/119 |

FOREIGN PATENT DOCUMENTS

| | | |
|---|---|---|
| CN | 201697441 U | 1/2011 |
| CN | 102353237 A | 2/2012 |
| CN | 103453752 A | 12/2013 |
| CN | 102759259 B | 6/2014 |
| CN | 102758657 B | 12/2014 |
| CN | 204041130 U | 12/2014 |
| DE | 41 15 781 C2 | 9/1994 |
| DE | 19518644 A1 | 11/1996 |
| DE | 196 12 186 A1 | 10/1997 |
| DE | 195 12 015 C2 | 7/1998 |
| DE | 196 01 931 C2 | 9/2000 |
| DE | 10319477 A1 | 11/2004 |
| DE | 10 2007 023 336 A1 | 11/2008 |
| DE | 10 2009 019 334 A1 | 11/2010 |
| DE | 102009035062 A1 | 2/2011 |
| EP | 0 576 053 B1 | 1/1996 |
| EP | 2 412 943 A2 | 2/2012 |
| EP | 2 423 465 A2 | 2/2012 |
| EP | 2 436 978 A1 | 4/2012 |
| EP | 2 873 934 A1 | 5/2015 |
| FR | 485639 A | 1/1918 |
| FR | 2 984 400 A1 | 6/2013 |
| JP | H06-146812 A | 5/1994 |
| WO | 2011/033559 A1 | 3/2011 |
| WO | 2012/005164 A1 | 1/2012 |

OTHER PUBLICATIONS

Extended European Search Report and Opinion issued in connection with related EP Application No. 15290138.5 dated Aug. 13, 2015.
Extended European Search Report and Opinion issued in connection with related EP Application No. 15290140.1 dated Nov. 24, 2015.
Extended European Search Report and Opinion issued in connection with related EP Application No. 15290141.9 dated Dec. 2, 2015.
Extended European Search Report and Opinion issued in connection with related EP Application No. 16169541.6 dated Jun. 21, 2016.
Extended European Search Report and Opinion issued in connection with related EP Application No. 16169514.3 dated Oct. 5, 2016.
Extended European Search Report and Opinion issued in connection with related EP Application No. 16169295.9 dated Nov. 21, 2016.
Edel et al., U.S. Appl. No. 15/162,904, filed May 24, 2016.
Edel et al., U.S. Appl. No. 15/163,159, filed May 24, 2016.
Edel et al., U.S. Appl. No. 15/156,632, filed May 17, 2016.

* cited by examiner

LIGNITE DRYING WITH A HEAT RECOVERY CIRCUIT

CROSS-REFERENCE TO RELATED APPLICATIONS

This application claims priority to European Patent Application No. 15290139.3 filed May 26, 2015, the contents of which are hereby incorporated in its entirety.

TECHNICAL FIELD

The present disclosure relates generally to the thermal Integration of a lignite drying process within a coal power plant having a water/steam power cycle. Such power plants may include CO2 capture units.

BACKGROUND

The general principle of lignite drying in a lignite fired plant is well known and involves using either hot flue gas extraction and/or steam extraction from the water/steam cycle to supply thermal energy to the lignite drying systems comprising beater mills, rotary drum dryer or fluidized bed dryers.

So called beater mills technology uses hot flue gas extracted from the top of the furnace and then recirculates this extraction in the mill in order to evaporate the high amount of lignite moisture, which can be up to 60% of lignite content for "B" grade lignites. Drying is an important step as it enables pulverization of lignite necessary for combustion. A problem of such systems is that it results in a very high efficiency penalty due to the need for very high enthalpy heat from the boiler for the drying process. The high heat requirement results in high boiler losses due to the loss of residual sensible heat from the large flue gas flow and zero recovery of the latent heat of removed moisture from the lignite.

To at least mitigate this problem lignite pre-drying techniques have been developed using medium or low enthalpy heat to achieve partial or high level of lignite pre-drying before pulverization. The techniques can provide efficiency gains of up to 3% points without heat recovery of evaporation vapour of lignite moisture or 5% point with heat recovery of evaporation vapour of lignite moisture.

German patent DE 195 18 644 C2 provides a solution utilising so called Waste Heat Utilisation (WTA) type 1 and 2 processes in order to pre-drying lignite.

The WTA type I process includes a direct heat pump loop with a vapour compressor that utilises the moisture vapour as drying heat. After de-dusting to remove lignite particles, the vapour is compressed with a vapour-compressor and sent in the heat exchanger of the dryer. Remaining heat of the drying vapour condensates exiting the dryer heat exchanger can be integrated in the low pressure condensate heaters of a water steam cycle of a typical steam power plant. The process does not require any steam extraction from the water/steam cycle and may be operated independently from the power plant. While it maximizes recycle of the drying vapour heat to evaporate the lignite moisture the process can have the disadvantage that as "dirty" drying vapour is used for compression, the required compressor may be large and expensive and further may be fouled and/or eroded and/or corroded if no advanced cleaning of dirty vapour is carried out.

The alternate WTA type 2 process includes a steam extraction from water/steam cycle of a typical steam power plant for the drying heat source. This process is much simpler and cheaper than WTA type 1, however, optimisation of the location of steam extraction varies with plant load and as such may lead to lower net plant efficiency that the type 1 system if no or limited heat recovery from drying vapour occurs. A further problem can be that the maximization of the heat recovery from drying vapours for plant performance improvement, together with the cleaning of this vapour, for environmental reasons, may require cleaning of the dirty vapour by condensation in order to avoid release of pollutants which would otherwise occur if released directly in the atmosphere in the vapour state.

SUMMARY

A lignite fired steam power plant is disclosed that can provide improved or at least an alternate means of thermally integrating a lignite drying system into the power plant.

The system is such that the risk of fouling, corrosion or erosion of the heat pumps compressors of some prior art system is avoided.

In an aspect a lignite fired steam power plant comprises a water/steam power cycle, a dryer system for drying lignite coal and a heat recovery system for recovery of thermal energy from the vapour outlet line of the dryer system.

The water/steam power cycle includes a pressure series of steam turbines, a condenser at a low pressure end of pressure series of steam turbines configured and arranged to condense steam exhausted from the low pressure end of the pressure series of steam turbines, a first condensate line connected to the condenser, and a low pressure condensate preheat system, in the first condensate line, adapted to preheat condensate from the condenser.

The dryer system includes a dryer and a vapour outlet line for removing vapour from the dryer.

The heat recovery system comprises a second condensate line that fluidly spans between the condenser and the first condensate line so as to at least partially bypass the low pressure condensate preheat system, a third condensate line extending from the condenser to the low pressure condensate preheat system so as to bypass at least a portion of the low pressure condensate preheat system and the second condensate line, a condensate evaporator fluidly connected to the vapour outlet line and the third condensate line so as to enable evaporation of a condensate in the third condensate line against condensing vapour in the vapour outlet line, a first compressor located in the third condensate line downstream of the condensate evaporator and adapted to compress the evaporated condensate from the condensate evaporator, and a first heater connected to and downstream of the first compressor for desuperheating and condensing vapour from the first compressor.

In a further aspect the second condensate line additionally passes through the first heater so as to enable condensation of the evaporated condensate of the third condensate line against a condensate of the second condensate line.

A yet further aspect further comprises in the second condensate line a second heater that is connected to a first branch of the vapour outlet line branching from the vapour outlet line upstream of the condensate evaporator, so as to enable condensation of the vapour of the first branch against a condensate in the second condensate line.

In a further aspect the second heater is located in the second condensate line upstream of the first heater.

Another aspect includes a third heater located in the second condensate line downstream of the first heater, and a second compressor that is connected to the third condensate fluidly between the first compressor and the first heater and further connected to the third heater, so as to enable heating of the condensate from the second condensate line with an exhaust from the second compressor.

Another aspect comprises a second branch that branches from the vapour outlet line upstream of the condensate evaporator, and a first combustion air heat exchanger in the second branch, so as to enable heating of a combustion air in the first combustion air heat exchanger with a vapour of the second branch.

Another aspect further comprises a first combustion air heat exchanger connected to the second heater, so as to enable heating of the combustion air with a fluid of the first branch exiting the second heater.

Another aspect further comprises a second combustion air heat exchanger, connected to and downstream of the first compressor and further located downstream of the first combustion air heat exchanger, configured and arranged to further heat the combustion air of the lignite steam power plant.

In another aspect the third condensate line extends to the low pressure condensate preheat system by joining the second condensate line.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, an embodiment of the present disclosure is described more fully hereinafter with reference to the accompanying drawings, in which.

DETAILED DESCRIPTION

Figure 1:
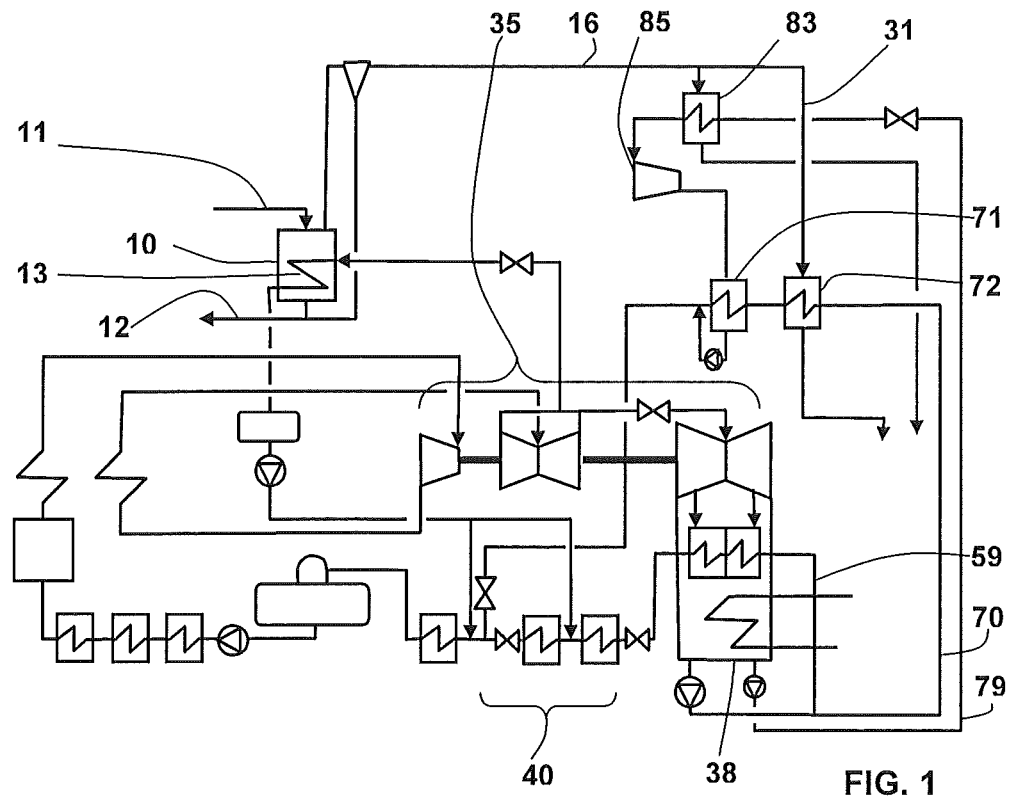
FIG. 1 is a schematic of a lignite fired power plant with a heat recovery system that integrates a lignite drying system with a water/steam power cycle.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiment disclosed herein.

FIG. 1 shows an exemplary embodiment of a lignite fired steam power plant for drying pulverised lignite utilising an indirect heat pump process. In its simplest form the system comprises a dryer system, a heat recovery system for recovering thermal energy from a vapour exhaust of the dryer 10 and a water/steam power cycle for at least partially receiving recovered thermal energy from the heat recovery system. The water/steam power cycle may additionally provide thermal energy in the form of extraction steam as an energy source for the dryer 10.

Figure 2:
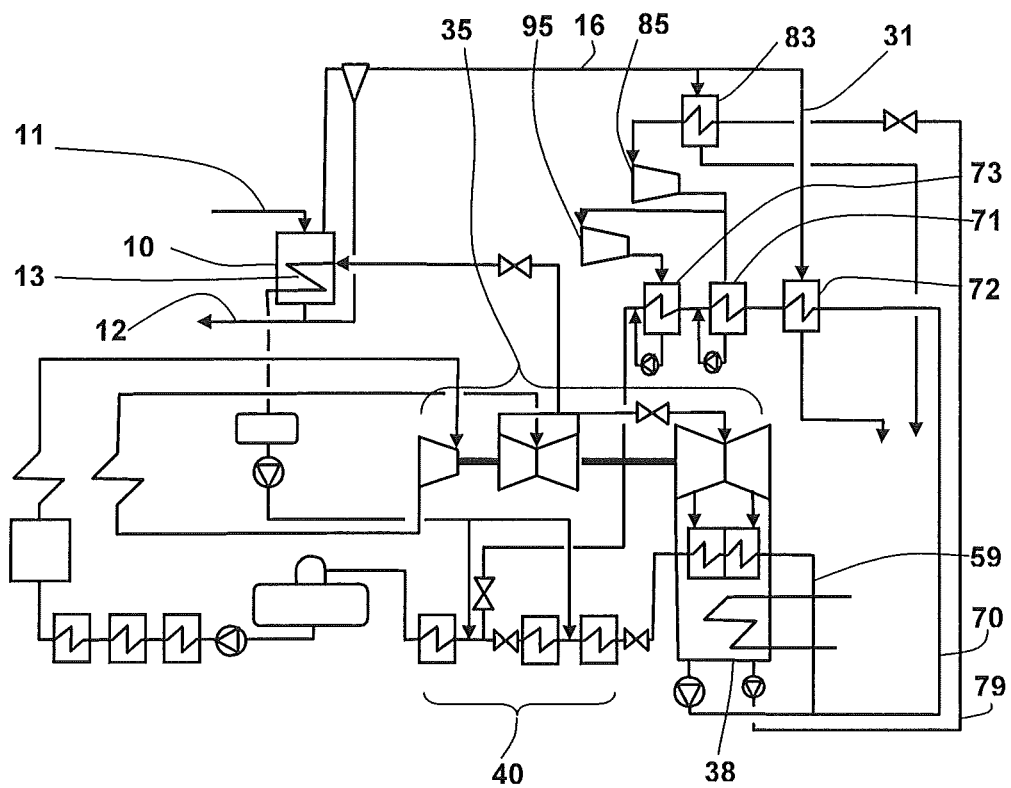
FIG. 2 is a schematic the lignite fired power plant of FIG. 1 with an additional compressor in the heat recovery system

In an exemplary embodiment shown in FIG. 1-3 the drying system includes an inlet line 11 to direct lignite into the dryer 10, a dryer heat exchanger 13 for evaporator drying of the lignite, a vapour outlet line 16 for exhausting moisture laden gas from the dryer 10 and a solids outlet line 12 for discharging dried lignite for use in a combustor. The dryer 10 can be a steam fluidized bed dryer or a steam heated rotary tube dryer and may typically operate at or close to atmospheric pressure.

In an exemplary embodiment vapour in the vapour outlet line 16 is first de-dusted in a particle removal system, such as a cyclone, electrostatic precipitator, fabric filter or any combination of a cyclone, electrostatic precipitator, fabric filter cycle, when lignite particles removed from the particle removal system are returned to the dryer 10 or the solids outlet line 12.

In an exemplary embodiment shown in FIG. 1-3 the water/steam power cycle includes a pressure series of steam turbines 35. A condenser 38, configured and arranged to condense steam exhausted from the pressure series of steam turbines 35, is located at a low pressure end of pressure series of steam turbines 35. Condensed steam from the condenser 38 is then directed through a first condensate line 59 that includes a low pressure condensate preheat system 40 having one or more preheaters, In an exemplary embodiment applicable to an atmospheric or low pressure dryer, the water/steam power cycle is connected to the dryer heat exchanger 13 by extraction steam provide at about 3-4 Bara and by a condensate return that returns condensate to the low pressure condensate preheat system 40. In this arrangement steam is condensed within the dryer 10 in the dryer heat exchanger 13 causing evaporation of wet lignite moisture, thus producing the vapour that is exhausted from the dryer 10 by a vapour outlet line 16. As required extraction steam may be de-superheated before entering the dryer heat exchanger 13.

In an exemplary embodiment shown in FIG. 1, the heat recovery system for recovery includes a third condensate line 79, a condensate evaporator 83, a first compressor 85, a first heater 71, and a second condensate line 70.

The second condensate line 70 extends from the condenser 38 to the low pressure condensate preheat system 40 so as to bypass at least a portion of the low pressure condensate preheat system 40.

The condensate evaporator 83 is fluidly connected to the vapour outlet line 16 and the third condensate line 79 so as to enable evaporation of condensate in the third condensate line 79 against condensing vapour in the vapour outlet line 16. In the third condensate line 79 downstream of the condensate evaporator 83 is the first compressor 85, which is adapted to compress evaporated condensate from the condensate evaporator 83 to typically between 3-4 Bara. After compression of evaporated condensate, the evaporated condensate is desuperheated and condensed in the first heater 71 located in the third condensate line 79 downstream of the first compressor 85.

In an exemplary embodiment shown in FIGS. 1 the first heater 71 is located in the third condensate line 79 and the now condensed evaporated condensate in the third condensate line 79 re-joins the first condensate line 59 either directly or via the second condensate line 70.

In an exemplary embodiment shown in FIGS. 1 the second condensate line 70 typically includes a condensate pump at an upstream end to extract condensate from the condenser 38 and boost the condensate pressure and a control valve to modulate the flow-rate through the second condensate line 70

The third condensate line 79 includes a condensate pump at an upstream end to extract, boost and/or control condensate flow, as well as a control valve in the liquid flowing portion of the line, to modulate the flow-rate and control the pressure through the third condensate line 79. As the pressure requirements of the first condensate line 59 and second condensate line 70 may be different to that of the third condensate line 79, the condensate pump of the third condensate line 79 may be different to the condensate pump of the second condensate line 70.

In an exemplary embodiment shown in FIG. 1 the lignite fired steam power plant further comprises a second heater 72 located in the second condensate line 70, upstream of the first heater 71, and connected to a first branch 31 of the vapour outlet line 16 wherein the first branch branches from the vapour outlet line 16 at a point upstream of the condensate evaporator 83 so as to enable energy transfer from the first branch to the second condensate line 70 in the second heater 72.

In an exemplary embodiment shown in FIG. 2, in addition to the second heater 72 and the first heater 71, the second condensate line 70 includes a third heater 73 in the second condensate line 70 downstream of the first heater 71 as well as a second compressor 95. The second compressor 95, is located in the heat recovery system and is connected to the third condensate line 79, at an upstream end, fluidly between the first compressor 85 and the first heater 71, and at a downstream end, to the third heater 73 so as to enable heating of a condensate in the second condensate line 70 with an exhaust from the second compressor 95.

Figure 3A:
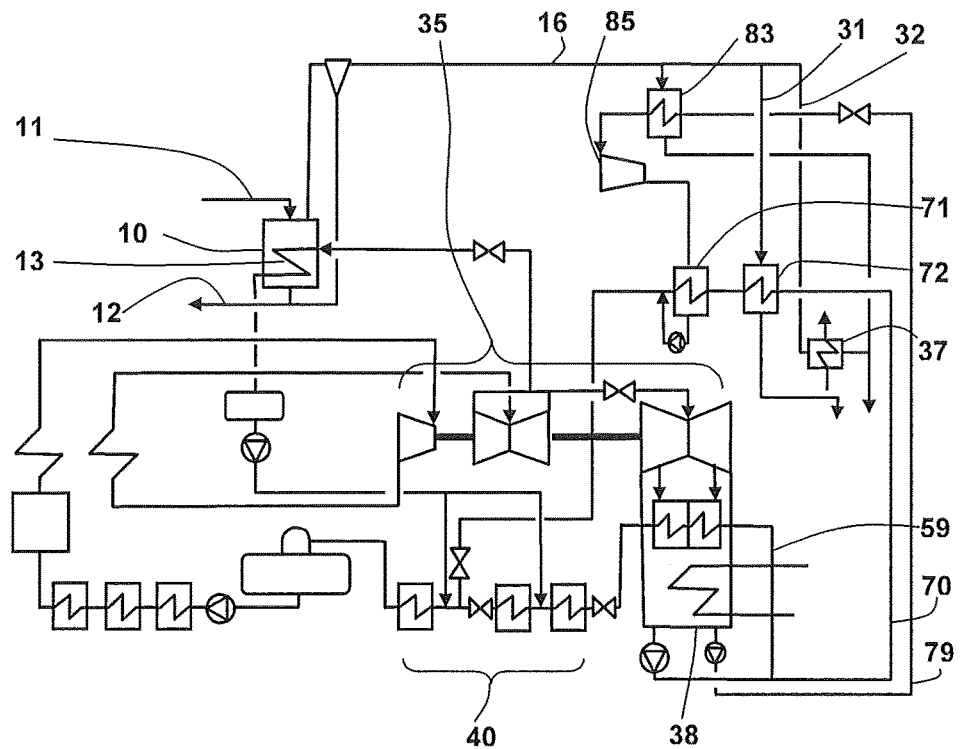
FIG. 3a-c are schematics of a lignite fired power with a heat recovery system that integrates a lignite drying system with a water/steam power cycle and further includes heat recovery through combustion air preheating.

In an exemplary embodiment shown in FIG. 3a the heat recovery system for recovery includes a third condensate line 79, a condensate evaporator 83, and a first compressor 85, a first heater 71, a second heater 72 and a second condensate line 70.

The second condensate line 70 extends from the condenser 38 to the low pressure condensate preheat system 40 so as to bypass at least a portion of the low pressure condensate preheat system 40.

The condensate evaporator 83 is fluidly connected to the vapour outlet line 16 and the third condensate line 79 so as to enable evaporation of condensate in the third condensate line 79 against condensing vapour in the vapour outlet line 16. In the third condensate line 79 downstream of the condensate evaporator 83 is the first compressor 85, which is adapted to compress evaporated condensate from the condensate evaporator 83 to typically between 3-4 Bara. After compression of evaporated condensate, the evaporated condensate is desuperheated and condensed in the first heater 71 located in the third condensate line 79 downstream of the first compressor 85.

The first heater 71 is located in the third condensate line 79 and the now condensed evaporated condensate in the third condensate line 79 re-joins the first condensate line 59 either directly or via the second condensate line 70.

The second heater 72 is located in the second condensate line 70, upstream of the first heater 71, and connected to a first branch 31 of the vapour outlet line 16 wherein the first branch branches from the vapour outlet line 16 at a point upstream of the condensate evaporator 83 so as to enable energy transfer from the first branch to the second condensate line 70 in the second heater 72.

The exemplary embodiment shown in FIG. 3a further includes a second branch 32 of the vapour outlet line 16 that branches from the vapour outlet line 16 upstream of the condensate evaporator 83 as well as a first combustion air heat exchanger 36, connected to the second branch 32 so as to enable heating of a combustion air located in the first combustion air heat exchanger 36 that is used for combustion of lignite using a vapour of the second branch 32

Figure 3B:
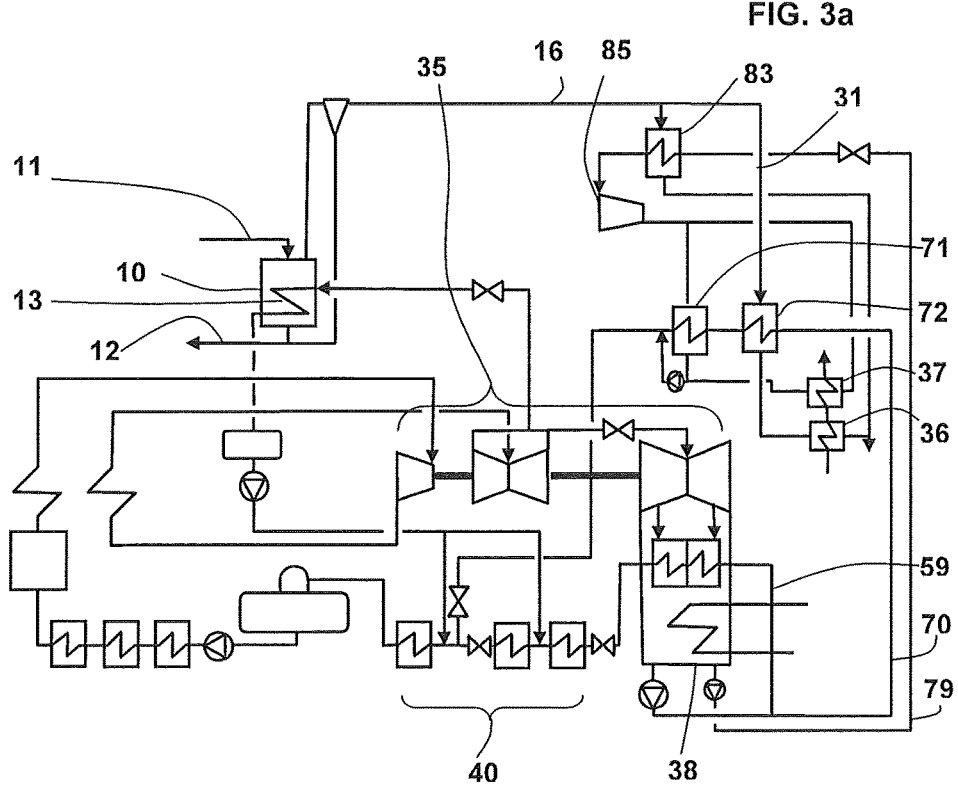

An alternate exemplary embodiment, shown in FIG. 3b further includes a second combustion air heat exchanger 37 connected to the third condensate line 79 at a point between the first compressor 85 and the first heater 71 so as to enable heating of a combustion air in the second combustion air heat exchanger 37 using an evaporated condensate from the first compressor 85. In this alternate exemplary embodiment, condensed evaporator condensate from the second combustion air heat exchanger 37 is returned to the second condensate line 70. Additionally, the first combustion air heat exchanger 36 preheat combustion air before the second combustion air heat exchanger 37 using condensed vapour of the vapour outlet line 16 from the second heater 72.

Figure 3C:
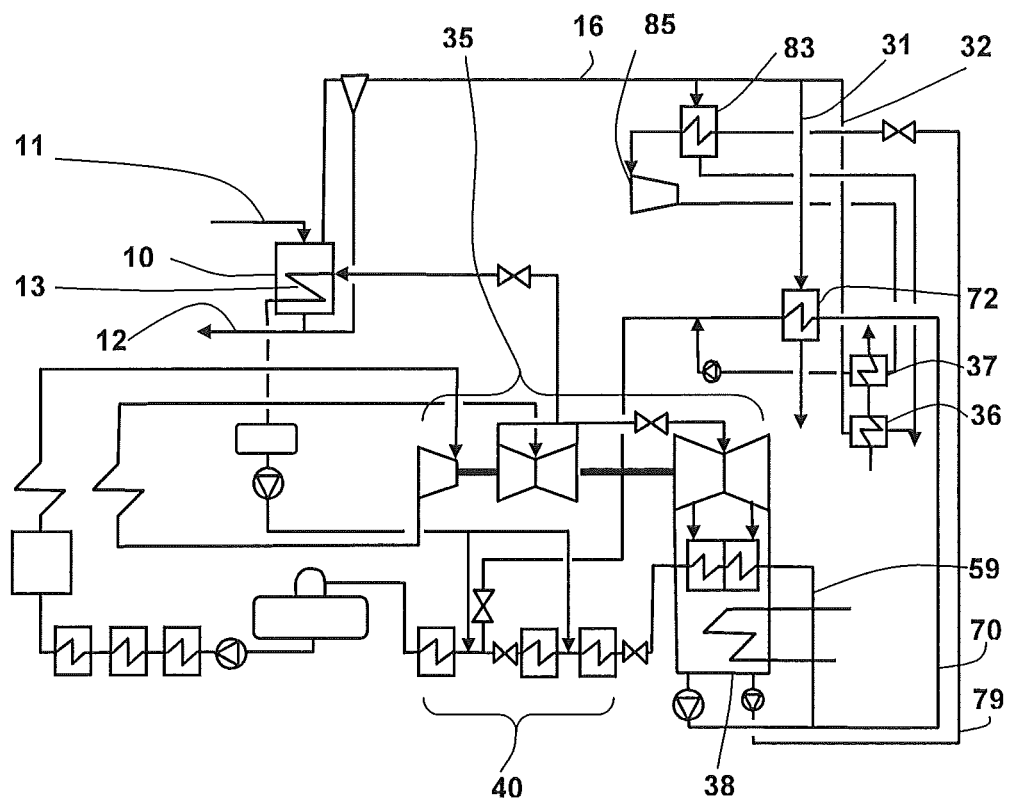

In a further alternative to the exemplary embodiment shown in FIG. 3b, FIG. 3c shows an exemplary embodiment that does not include a first heater 71, but instead all compressed evaporated condensate from the first compressor 85 flow through the second combustion air heat exchanger 37 while a second branch 32 of the vapour outlet line 16 that branches from the vapour outlet line 16 upstream of the condensate evaporator 83 provides thermal energy to a first combustion air heat exchanger 36 that preheat combustion air upstream of the second combustion air heat exchanger 37.

Although the disclosure has been herein shown and described in what is conceived to be the most practical exemplary embodiment, the present disclosure can be embodied in other specific forms. For example, while exemplary embodiments that included a combustion air heat exchangers (36, 37) connected to condensate or vapour lines, the connection may be by physical connection wherein the condensate or vapour lines pass through the combustion air heat exchangers (36, 37) or else by thermal means by, for example, an intermediate thermal loop. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

The invention claimed is:

1. A lignite fired steam power plant comprising:
   a water/steam power cycle having:
      a pressure series of steam turbines;
      a condenser at a low pressure end of pressure series of steam turbines configured and arrange to condense steam exhausted from the low pressure end of the pressure series of steam turbines;
      a first condensate line connected to the condenser; and
      a low pressure condensate preheat system, in the first condensate line, adapted to preheat condensate from the condenser;
   a dryer system for drying lignite coal, the dryer system having:
      a dryer; and
      a vapour outlet line for removing vapour from the dryer,
   a heat recovery system for recovery of thermal energy from the vapour outlet line, the heat recovery system comprising:
      a second condensate line, fluidly spanning between the condenser and the first condensate line so as to at least partially bypass the low pressure condensate preheat system;

a third condensate line extending from the condenser to the low pressure condensate preheat system so as to bypass at least a portion of the low pressure condensate preheat system and at least a portion of the second condensate line;

a condensate evaporator fluidly connected to the vapour outlet line and the third condensate line so as to enable evaporation of a condensate in the third condensate line against condensing vapour in the vapour outlet line;

a first compressor, in the third condensate line downstream of the condensate evaporator, adapted to compress the evaporated condensate from the condensate evaporator; and a first heater connected to and downstream of the first compressor for desuperheating and condensing vapour from the first compressor.

2. The lignite fired steam power plant of claim 1, wherein the second condensate line additionally passes through the first heater so as to enable condensation of the evaporated condensate of the third condensate line against a condensate of the second condensate line.

3. The lignite fired steam power plant of claim 1, further comprising, in the second condensate line, a second heater that is connected to a first branch of the vapour outlet line branching from the vapour outlet line upstream of the condensate evaporator, so as to enable condensation of the vapour of the first branch against a condensate in the second condensate line.

4. The lignite fired steam power plant of claim 3, wherein the second heater is located in the second condensate line upstream of the first heater.

5. The lignite fired steam power plant of claim 3, further comprising:

a third heater in the second condensate line, downstream of the first heater; and a second compressor, connected to the third condensate fluidly between the first compressor and the first heater, and further connected to the third heater, so as to enable heating of the condensate from the second condensate line with an exhaust from the second compressor.

6. The lignite fired steam power plant of claim 3, further comprising:

a second branch that branches from the vapour outlet line upstream of the condensate evaporator; and a first combustion air heat exchanger in the second branch, so as to enable heating of a combustion air in the first combustion air heat exchanger with a vapour of the second branch.

7. The lignite fired steam power plant of claim 3, further comprising a first combustion air heat exchanger connected to the second heater so as to enable heating of a combustion air with a fluid of the first branch exiting the second heater.

8. The lignite fired steam power plant of claim 6, comprising a second combustion air heat exchanger, connected to and downstream of the first compressor and downstream of the first combustion air heat exchanger, for desuperheating and condensing vapour from the first compressor and enabling further heating of the combustion air of the lignite steam power plant.

9. The lignite fired steam power plant of claim 1 wherein the first heater is configured and arranged to heat a combustion air.

10. The lignite fired steam power plant of claim 1 wherein the third condensate line extends to the low pressure condensate preheat system by joining the second condensate line.

* * * * *